United States Patent [19]

Shinozaki et al.

[11] 4,041,798
[45] Aug. 16, 1977

[54] PARKING BRAKE

[75] Inventors: Takashi Shinozaki, Tokorozawa; Susumu Asai, Sayama, both of Japan

[73] Assignee: Honda Giken Kogyo Kabushiki Kaisha, Tokyo, Japan

[21] Appl. No.: 695,156

[22] Filed: June 11, 1976

[30] Foreign Application Priority Data

June 17, 1975 Japan ................................. 50-82135

[51] Int. Cl.[2] .......................... G05G 1/14; G05G 5/06; B60T 7/04
[52] U.S. Cl. ........................................ 74/512; 74/542; 74/564; 74/577 M; 180/82 B; 188/265
[58] Field of Search ............... 180/30, 82 B; 188/82.7, 188/265; 74/489, 512, 540, 541, 542, 564, 576, 577 R, 577 SF, 577 M, 578

[56] References Cited

U.S. PATENT DOCUMENTS

| 1,532,868 | 4/1925 | Blackburn | 188/265 X |
| 1,711,929 | 5/1929 | Druhe | 188/265 X |
| 3,948,361 | 4/1976 | Carlson | 74/541 X |

FOREIGN PATENT DOCUMENTS

| 59,391 | 5/1954 | France | 74/578 |
| 810,452 | 3/1937 | France | 180/30 |

Primary Examiner—Carlton R. Croyle
Assistant Examiner—Leonard Smith

[57] ABSTRACT

A parking brake mechanism for a motorcycle having a rear brake pedal which is to be depressed for applying a brake on a rear road wheel. An annular ratchet wheel is rigidly connected to the pivoted end of the rear brake pedal for simultaneous rotation therewith, and one or more pawls pivotally mounted within the ratchet wheel are spring biased into engagement with teeth formed on its inside surface. Normally, the pawls are held out of engagement with the ratchet teeth by a rotary cam ring. Upon angular displacement of this cam ring relative to the pawls, the ratchet mechanism functions to permit the rear brake pedal to be depressed but to prevent its return motion. The cam ring can be actuated either by a retractable footrest or by a hand lever on the steering handle of the motorcycle.

7 Claims, 9 Drawing Figures

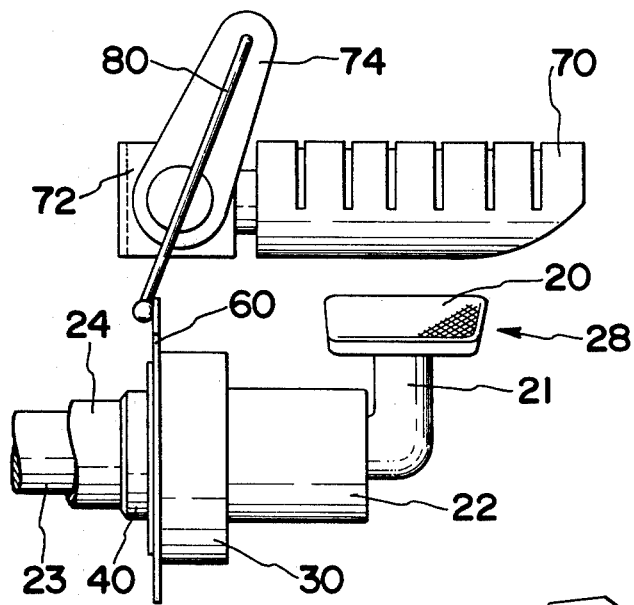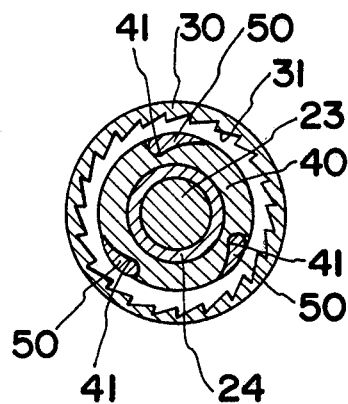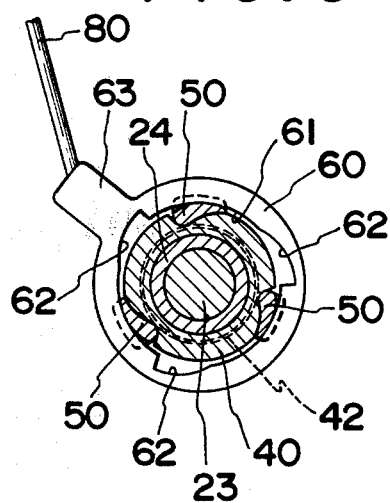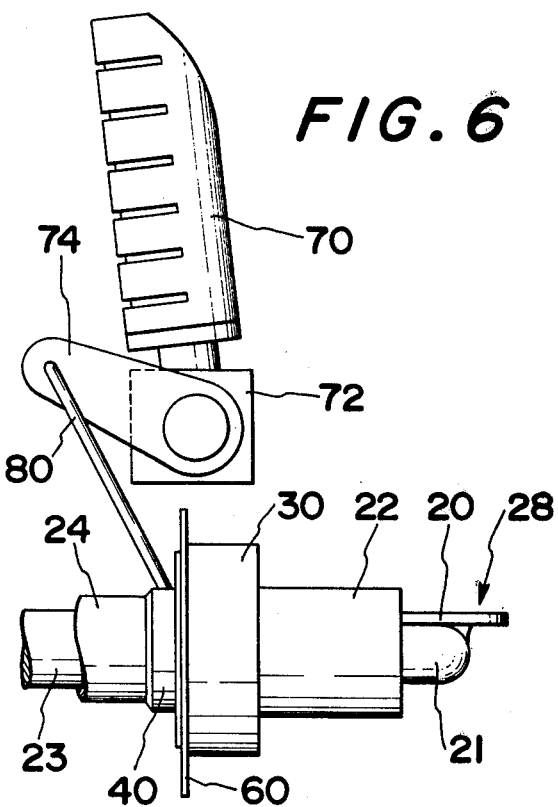

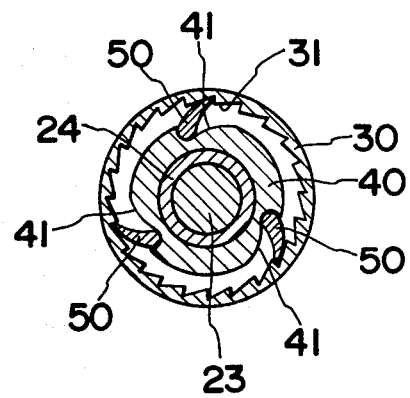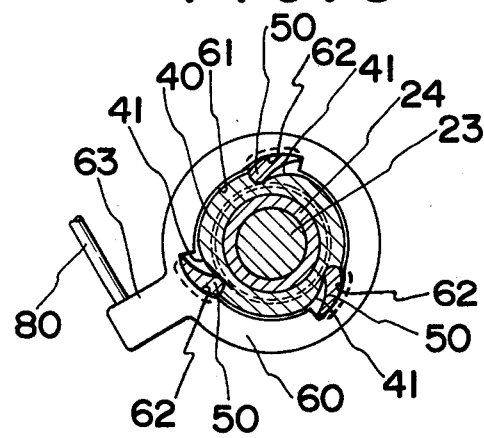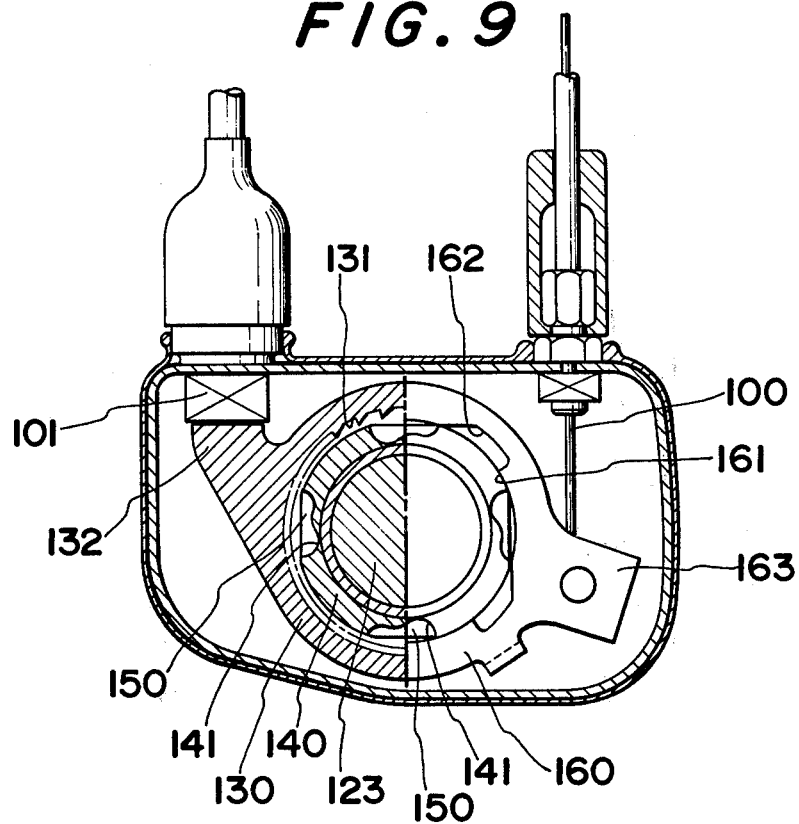

PARKING BRAKE

BACKGROUND OF THE INVENTION

1. Field of the Invention

This invention relates to parking brakes, known also as emergency brakes, and more specifically to a parking brake mechanism particularly well adapted for use on motorcycles or twowheeled automotive vehicles.

2. Description of the Prior Art

Mechanical transmissions or gearboxes included in motorcycle power trains can be made to function as parking brake by being shifted to a particular gear setting on parking. For parking with the engine idling, however, motorcycles of this type require an exclusive parking brake mechanism. The need for a parking brake is, however, more pronounced in motorcycles with automatic transmissions including a hydrodynamic drive unit, because these transmissions do not lend themselves for use as parking brake.

In view of the foregoing there has been suggested a parking brake mechanism wherein a retractable motorcycle stand is mechanically related to the rear brake pedal so that this pedal may be depressed automatically to apply the rear brake when the stand is moved from its retracted to working position on parking (Japanese Utility Model Publication No. 49-46109).

According to this prior art parking brake mechanism, the motorcycle is held braked as long as the stand stays in its working position. This is inconvenient because it is customary among motorcyclists to move the vehicle, by their own physical effort, short distances from its temporarily parked location with the stand left in the working position.

SUMMARY OF THE INVENTION

It is an object of this invention to provide an improved parking brake mechanism particularly suitable for use on motorcycles notably including those with automatic transmissions.

Another object of the invention is to provide a parking brake mechanism of greatly simplified, compact construction which can be easily installed in position on a vehicle without any substantial alteration of its existing parts.

A further object of the invention is to provide a parking brake mechanism associated with a usual service brake in such a manner that the service brake can be positively maintained in an applied condition during parking.

A further object of the invention is the provide a parking brake mechanism which can be actuated by means other than a motorcycle stand so that the vehicle can be moved with the stand in its working position.

A still further object of the invention is to provide a parking brake mechanism which is so reliable in operation that, for example, motorcycles with automatic transmissions can be parked safely with the engine idling.

Briefly, the parking brake mechanism according to this invention is contemplated for use on a vehicle having a brake pedal which is to be turned in a predetermined direction for applying a brake on the vehicle. The parking brake mechanism comprises a ratchet wheel connected to the brake pedal for simultaneous rotation therewith, and at least one pawl movable into and out of engagement with teeth on the ratchet wheel. The pawl is biased by resilient means into engagement with the ratchet wheel teeth for permitting the brake pedal to be turned in the said predetermined direction only but is normally held out of engagement therewith by displaceable cam means. On parking the vehicle, the operator may cause displacement, via suitable actuating means, of the cam means with respect to the pawl to permit same to engage the ratchet wheel teeth.

In a preferred embodiment of the invention, in which the parking brake mechanism is disclosed as adapted for a motorcycle with an automatic transmission, the cam means is operatively connected to one of the pair of footrests of the motorcycle. When this footrest is pivotally moved from its working to retracted position on parking, therefore, the ratchet mechanism operates to permit the brake pedal to be depressed but to prevent its return motion. The usual service brake of the motorcycle thus functions as the parking brake as the brake pedal is subsequently depressed to a desired degree.

Alternatively, the cam means can be connected to a hand lever on the steering handle of the motorcycle by means of a cable. This alternative has the advantage that the rider can easily apply the parking brake while being still seated on the saddle.

The above and other objects, features and advantages of this invention and the manner of attaining them will become more clearly apparent, and the invention itself will best be understood, upon consideration of the following description taken in connection with the accompanying drawings showing specific embodiments of the invention.

BRIEF DESCRIPTION OF THE DRAWINGS

FIG. 3 is an elevational view of the parking brake mechanism as seen in the direction of the arrow 3 in FIG. 2, the view showing a retractable footrest of the motorcycle in its working or horizontal position to indicate that the parking brake is not applied;

FIG. 4 is a sectional view taken along the line 4—4 of FIG. 2, the view showing a ratchet mechanism in a condition when the parking brake is not applied;

FIG. 5 is a sectional view, partly in side elevation, taken along the line 5—5 of FIG. 2, the view showing a cam ring, associated with the ratchet mechanism, in its angular position relative to ratchet pawls when the parking brake is not applied;

FIG. 6 is a view similar to FIG. 3 except that the footrest is shown in its retracted or upstanding position to indicate that the parking brake is applied;

FIG. 7 is a view similar to FIG. 4 except that the ratchet mechanism is shown in a condition when the parking brake is applied;

FIG. 8 is a view similar to FIG. 5 except that the cam ring is shown in its angular position relative to the ratchet pawls when the parking brake is applied; and FIG. 9 illustrates, half in vertical section and half in elevation, another preferred form of the parking brake mechanism according to the invention.

DESCRIPTION OF THE PREFERRED EMBODIMENTS

Figure 1:
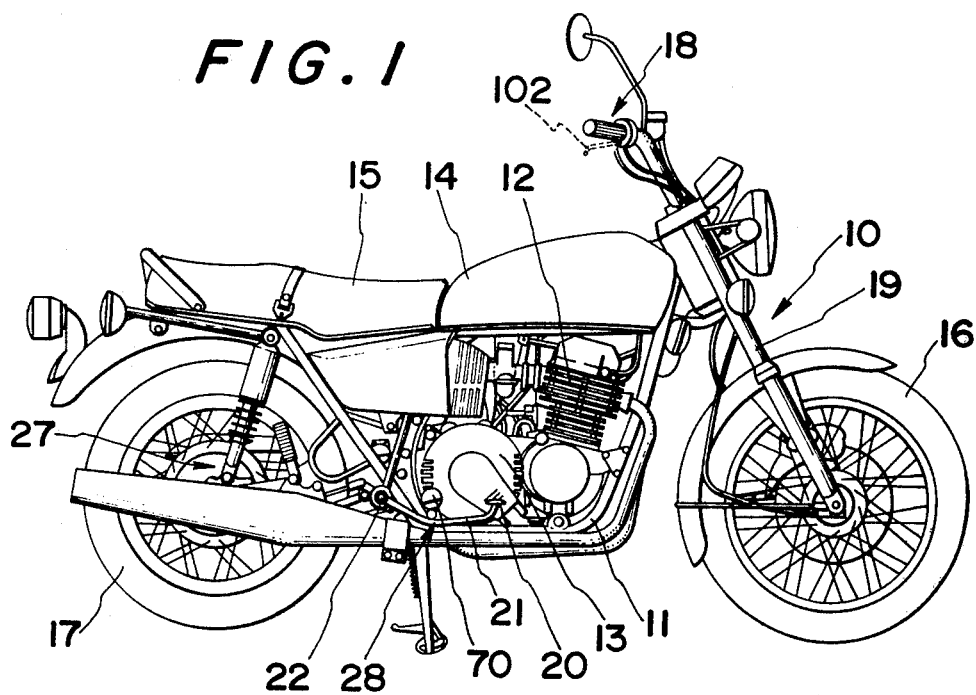
FIG. 1 is a side elevational view of a motorcycle to which is applicable the parking brake mechanism according to this invention.

FIG. 1 of the drawings illustrates the organization of a motorcycle, generally indicated by the numeral 10, to which the inventive principles are applicable to advantage. The motorcycle 10 broadly comprises a frame 11 of tubular pressed steel construction, an internal combustion engine 12 cradled on the frame, an automatic transmission 13 mounted on the back of the engine, a fuel tank 14, a rider's seat or saddle 15, front and rear road wheels 16 and 17, a steering handle 18, and front forks 19 with telescopic shock absorbers. All the listed motorcycle components are conventional and therein lies no feature of this invention.

Shown at 28 is a rear brake pedal which is arranged on the right hand side of the motorcycle and which is to be foot operated for applying a brake 27 on the rear road wheel 17. The rear brake 27 may for example be of the well known internal expanding shoe type, comprising a brake drum rotatable with the rear road wheel 17 and expandable shoes mounted within the brake drum for frictionally arresting its rotation.

Figure 2:
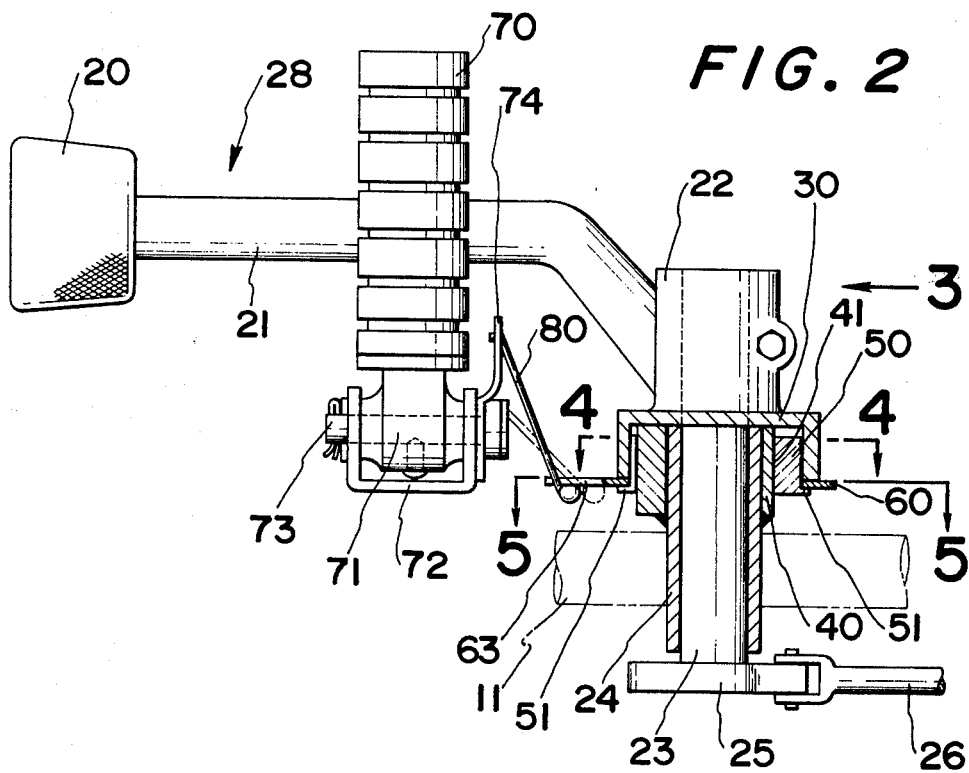
FIG. 2 is an enlarged top plan view of a preferred form of the parking brake mechanism adapted for use on the motorcycle of FIG. 1.

As illustrated in greater detail in FIGS. 2 and 3, the rear brake pedal 28 comprises a lever 21 terminating at its distal end in a flat, relatively broad head 20 which is to be pressed by the rider's foot, and at its proximal end in a cylindrical enlargement 22 which is screwed or otherwise rigidly fastened to one end of a short shaft or pin 23. This shaft is rotatably fitted in a sleeve 24 which is secured to the frame 11 as by means of a bracket (not shown). The other end of the shaft 23, projecting out of the sleeve 24, has a flange 25 which is shown to be knuckle jointed to a brake rod 26 operatively connected to the rear brake 27.

Thus, when the rear brake pedal 28 is depressed, that is, turned in a predetermined direction (clockwise as viewed in FIG. 1), the shaft 23 rotates relative to the sleeve 24 to exert a pull on the brake rod 26 via its flange 25. When pulled the brake rod 26 actuates the rear brake 27 thereby causing same to arrest the rotation of the rear road wheel 17 in accordance with the prior art.

The parking brake mechanism according to this invention includes a ratchet wheel 30 which is rigidly connected to, or formed integral with, the enlarged proximal end 22 of the rear brake pedal 28 for simultaneous rotation therewith. The ratchet wheel 30 is in the form of a ring or a short, hollow cylinder, closed only at its outboard end for rigid connection to the rear brake pedal 28, and surrounds part of the stationary sleeve 24 in coaxial relationship. It will be noted from FIG. 4 that a series of ratchet teeth 31 are formed on the inside surface of the ratchet wheel 30.

As best seen in FIGS. 2, 4 and 5, an annular pawl holder 40 is tightly fitted over that part of the stationary sleeve 24 which is surrounded by the ratchet wheel 30. The pawl holder 40 is intended to support one or more, three in the illustrated embodiment, pivotal pawls 50 which are movable into and out of engagement with the internal ratchet teeth 31 on the ratchet wheel 30.

FIGS. 4 and 5 clearly illustrate the three pawls 50 which are pivotally supported on the pawl holder 40 at angular spacings of 120 degrees from each other and which are accommodated in respective recesses 41 formed in its outside surface. Shown at 42 in FIG. 5 is a leaf spring bent into the shape of a ring and enclosed in the pawl holder 40 to cause the pawls 50 to tend to pivot outwardly into engagement with the ratchet wheel 30 (see FIG. 7) for permitting the rear brake pedal 28 to be turned in the brake applying direction only.

Normally, however, the rear brake pedal 28 must of course be capable of returning to its normal position of FIGS. 2 and 3 after having been depressed. The pawls 50 must therefore be held out of engagement with the ratchet wheel 30, by being nested in the respective recesses 41 of the pawl holder 40 in spite of the force of the leaf spring 42 as shown in FIG. 4.

This objective is accomplished in accordance with this invention by use of a displaceable cam ring 60 seen in FIGS. 2, 3 and 5. Also surrounding the pawl holder 40 together with the pawls 50 pivotally mounted thereon, the cam ring 60 is arranged coaxially with the ratchet wheel 30, in a position next to its open inboard end, so as to be rotatable relative to same. This cam ring is held in position by being slidably caught between the ratchet wheel 30 and rims 51, FIG. 2, projecting radially outwardly from the inboard ends of the pawls 50.

It will be observed from FIG. 5 that the cam ring 60 has an inside diameter only slightly greater than the outside diameter of the pawl holder 40 and makes slidable contact with the pawls 50.

The cam ring 60 has three recesses 62 formed in its inside edge 61 at constant angular spacings. These cam recesses 62 are normally held out of angular registration with the pawls 50 so that these pawls may be held nested in the holder recesses 44. When the cam ring 60 is angularly displaced through a predetermined angle in sliding contact with the pawls 50, however, the pawls will be received in the respective cam recesses 62 because then they will be pivoted outwardly under the bias of the leaf spring 42, as shown in FIG. 8. The pawls 50 thus engage the internal teeth 31 on the ratchet wheel 30.

Various means may be employed for causing such angular displacement of the cam ring 60 with respect to the pawls 50. This particular embodiment contemplates the use of a retractable footrest to that end.

Shown at 70 in FIGS. 2 and 3 is the retractable footrest on the right hand side of the motorcycle 10, as will be seen by referring back to FIG. 1, it being understood that another footrest, which may be either retractable or stationary, is provided on the left hand side of the motorcycle. The footrest 70 has its end 71 secured to a pivot pin 73 which is rotatably supported by a U-shaped bracket 72 affixed to the frame 11. The footrest 70 is therefore pivotable between a working or horizontal position shown in FIGS. 2 and 3 and a retracted or upright position shown in FIG. 6.

Fixedly mounted on one end of the pivot pin 73 is a lever 74 having its free end pivotally connected to one end of a link 80. The other end of this link is likewise pivotally connected to a tongue 63 of the cam ring 60. Preferably, a ball and socket joint may be employed for the pivotal connection between link 80 and cam ring tongue 63, as shown. The pivotal motion of the footrest 70 between its working and retracted positions can thus be translated into the rotary motion of the cam ring 60 relative to the pawls 50.

OPERATION

The parking brake mechanism according to this invention is illustrated in FIGS. 2 through 5 in a released condition, with the retractable footrest 70 in its working position to permit the motorcycle rider to rest his foot thereon. As shown in FIGS. 4 and 5, the cam ring 60 has now its recesses 62 out of angular registration with the pawls 50, so that these pawls are held out of engagement with the ratchet wheel teeth 31 in spite of the force of the leaf spring 42. The ratchet wheel 30 is therefore free to rotate in either direction with the rear brake pedal 28 and the shaft 23. During travel of the motorcycle 10 the rider may depress the rear brake pedal for braking the rear road wheel 17 via the brake rod 26 in the usual manner.

For setting the parking brake mechanism according to the invention, the rider may pivot the footrest 70 upwardly to its retracted position of FIG. 6 on parking the motorcycle 10. Thereupon the cam ring 60 is rotated counterclockwise from its FIG. 5 position to that illustrated in FIG. 8 via the lever 74 and the link 80, in which latter position the cam ring receives the pawls 50 in its recesses 62 by permitting same to be provided outwardly under the bias of the leaf spring 42. The pawls 50 thus engage the internal teeth 31 on the ratchet wheel 30.

It will be apparent from FIG. 7 that the ratchet wheel 30 is now locked by the pawls 50 against rotation in the counterclockwise direction, as seen in the drawing, but is free to rotate clockwise relative to the stationary pawl holder 40 and sleeve 24. As a consequence, the rear brake pedal 28 can still be depressed but, once depressed, is incapable of returning to its normal position of FIGS. 2 and 3.

Upon depression of the rear brake pedal 28, therefore, the rear brake 27 of the motorcycle is applied via the shaft 23 and the brake rod 26 and continues to be applied as long as the footrest 70 is held in its retracted position of FIG. 6. The braking force exerted on the rear rod wheel 17 of the motorcycle is of course determined by the extent to which the rear brake pedal 28 is depressed. Thus, when equipped with the parking brake mechanism according to the invention, the usual service brake of the motorcycle functions also as a parking brake.

For releasing the parking brake, the footrest 70 may be moved down to its working or horizontal position of FIGS. 2 and 3, whereupon the cam ring 60 is rotated clockwise from its FIG. 8 position back to that of FIG. 5 to cause the pawls 50 to disengage the ratchet wheel teeth 31 and to be nested in the respective holder recesses 41. With the ratchet wheel 30 thus disengaged, the rear brake pedal 28 is free to turn back to its normal position of FIGS. 2 and 3 to release the rear brake 27.

SECOND FORM

In an alternate embodiment of the invention shown in FIG. 9, various parts of the modified parking brake mechanism are identified by the same reference numerals used to identify the corresponding parts, if any of the preceeding embodiment, but with the digit "1" prefixed to such numerals. The modified parking brake mechanism is best characterized by the fact that a cam ring 160 has its tongue 163 connected via cable 100 to a hand lever 102, FIG. 1, which may be pivotally mounted on the steering handle 18 of the motorcycle for operation by the rider seated on the saddle 15.

Upon actuation of the hand lever 102, instead of the retractable footrest of the preceding embodiment, the cam ring 160 undergoes angular displacement relative to a pawl holder 140, with its inside edge 161 in sliding contact with three pivotal pawls 150 nested in holder recesses 141, until these pawls are pivoted outwardly into respective cam recesses 162 under the bias of the leaf spring 42 (not shown in FIG. 9). The pawls 150 thus engage internal teeth 131 on a ratchet wheel 130, so that the rear brake of the motorcycle can be used as a parking brake by depressing the rear brake pedal connected to a shaft 123 as in the preceding embodiment. Further, after the operation of cable 100 was released, the cam ring 160 will be resumed normal conditions (shown in FIG. 9).

Shown at 101 is a microswitch for on-off control of a brake pilot lamp (not shown) which may be mounted on the usual instrument panel of the motorcycle. The microswitch 101 is adapted to be actuated by an arm 132 extending from the ratchet wheel 130 when the rear brake pedal is depressed to apply the rear brake. The rider is thus enabled to visually confirm the braking of the rear road wheel. Other details of construction and operation are as set forth above in connection with FIGS. 1 through 8.

It is to be understood that this invention is not to be limited by the exact details of the embodiments disclosed herein since they are intended to be illustrative of the principles of the invention. The concepts and principles of the invention may be embodied in other forms or adapted for vehicles of other than the illustrated type. It is therefore appropriate that the invention be construed broadly and in a manner consistent with the fair meaning or proper scope of the following claims.

What is claimed is:

1. A parking brake mechanism for a vehicle of the type having a brake pedal which is to be turned in a predetermined direction for applying a brake on the vehicle, the parking brake mechanism comprising, in combination, a ratchet wheel connected to said brake pedal for simultaneous rotation therewith, said ratchet wheel having a series of ratchet teeth formed thereon, a pawl movable between a first position where said pawl engages said ratchet teeth on said ratchet wheel for permitting said brake pedal to be turned in said predetermined direction only and a second position where said pawl disengages said ratchet teeth on said ratchet wheel, resilient means yieldably urging said pawl toward said first position, cam means for normally holding said pawl in said second position against the force of said resilient means, said cam means being displaceable with respect to said pawl for permitting same to be moved from said second to said first position by said resilient means, and means actuated by a vehicle operator to cause displacement of said cam means with respect to said pawl.

2. A parking brake mechanism for a vehicle of the type having a brake pedal which is to be found in a predetermined direction for applying a brake on the vehicle, the parking brake mechanism comprising, in combination, an annular ratchet wheel connected to said brake pedal for simultaneous rotation therewith, said ratchet wheel having a series of ratchet teeth formed on its inside surface, a pawl pivotally supported within said ratchet wheel for pivotal movement between a first position where said pawl engages said ratchet teeth on said ratchet wheel for preventing said brake pedal from turning in a direction opposite to said predetermined direction and a second position where said pawl disengages said ratchet teeth, resilient means yieldably urging said pawl toward said first position, cam means for normally holding said pawl in said second position in spite of the force of said resilient means, said cam means being displaceable with respect to said pawl for permitting same to be pivoted from said second to said first position by said resilient means, and means actuated by a vehicle operator to cause displacement of said cam means with respect to said pawl.

3. In a motorcycle of the type including a brake pedal which is to be turned in a predetermined direction for applying a brake on one of road wheels of the motorcycle, and a pair of footrests at least one of which is movable between a working and a retracted position, a parking brake mechaism comprising, in combination, an annular ratchet wheel rigidly connected to said brake pedal for simultaneous rotation therewith, said ratchet wheel having a series of ratchet teeth on its inside surface, a pawl pivotally supported within ratchet wheel for pivotal movement between a first position where said pawl engages said ratchet teeth on said ratchet wheel for preventing said brake pedal from turning in a direction opposite to said predetermined direction and a second position where said pawl disengages said ratchet teeth, resilient means yieldably urging said pawl toward said first position, cam means for normally holding said pawl in said second position in spite of the force of said resilient means, said cam means being displaceable with respect to said pawl for permitting same to be pivoted from said second to said first position by said resilient means, and means operatively connecting said cam means to said one footrest so as to cause displacement of the former upon movement of the latter from said working to said retracted position.

4. In a motorcycle of the type including a rear brake pedal which is to be depressed for applying a rear brake of the motorcycle, a pair of footrests at least one of which is pivotable between a horizontal and an upright position, and an automatic transmission, a parking mechanism comprising, in combination, an annular ratchet wheel rigidly connected to said rear brake pedal so as to be rotated thereby, said ratchet wheel having a series of ratchet teeth on its inside surface, a pawl holder fixedly mounted within said ratchet wheel, a plurality of pawls pivotally supported on said pawl holder in angularly spaced relationship to each other, said pawls being each pivotable between a first position where each said pawl engages said ratchet teeth on said ratchet wheel for permitting said brake pedal to be depressed but for preventing same for returning to its normal position and a second position where each said pawl disengages said ratchet teeth, spring means yieldably urging said pawls toward said first positions, a cam ring surrounding said pawl holder and said pawls, said cam ring being rotatable within limits in sliding contact with said pawls to permit same to be pivoted between said first and second positions, and means operatively connecting said cam ring to said one footrest to translate the pivotal motion of the latter into the rotary motion of the former, whereby said pawls are held in said second positions against the force of said spring means when said one footrest is in said horizontal position and are pivoted to said first positions when said one footrest is moved to said upright position.

5. The parking brake mechanism as recited in claim 4, wherein said operatively connecting means comprises a lever pivotable simultaneously with said rear brake pedal, and a link pivotally connected at both ends to said lever and to said cam ring.

6. In a motorcycle of the type including a brake pedal which is to be turned in a predetermined direction for applying a brake on one of road wheels for the motorcycle, a parking brake mechanism comprising, in combination, an annular ratchet wheel rigidly connected to said brake pedal for simultaneous rotation therewith, said ratchet wheel having a series of ratchet teeth on its inside surface, a pawl pivotally supported within said ratchet wheel for pivotal movement between a first position where said pawl engages said ratchet teeth on said ratchet wheel for preventing said brake pedal from turning in a direction opposite to said predetermined direction and a second position where said pawl disengages said ratchet teeth, resilient means yieldably urging said pawl toward said first position, cam means for normally holding said pawl in said second position in spite of the force of said resilient means, said cam means being displaceable with respect to said pawl for permitting same to be pivoted for said second to said first position by said resilient means, and a hand lever operatively connected to said cam means to cause displacement thereof with respect to said pawl.

7. The parking brake mechanism as recited in claim 6, wherein the motorcycle includes a steering handle, and wherein said hand lever is pivotally mounted on said steering handle and is connected to said cam means via cable.

* * * * *